(12) United States Patent
Kerstens

(10) Patent No.: US 8,800,434 B2
(45) Date of Patent: Aug. 12, 2014

(54) DISPENSER AND COMPOSITION TO MAKE ICE COFFEE

(75) Inventor: Peter Kerstens, Kapellen (BE)

(73) Assignee: Rudiger Cruysberghs, Brussels (BE)

( * ) Notice: Subject to any disclaimer, the term of this patent is extended or adjusted under 35 U.S.C. 154(b) by 642 days.

(21) Appl. No.: 12/381,697

(22) Filed: Mar. 16, 2009

(65) Prior Publication Data

US 2009/0235828 A1     Sep. 24, 2009

(51) Int. Cl.
*B65D 83/60* (2006.01)
*A23F 5/24* (2006.01)

(52) U.S. Cl.
CPC ............... *B65D 83/60* (2013.01); *A23F 5/243* (2013.01)
USPC .............. 99/323.1; 222/399; 222/402.18; 426/115; 426/116

(58) Field of Classification Search
CPC ................................. B65D 83/60; A23F 5/243
USPC .................. 99/323.1; 222/144.5, 146.6, 399, 222/402.18; 426/115, 116, 594, 595
IPC ............... B65D 83/60; A23F 5/28; A47J 31/40, A47J 31/41, 5/24
See application file for complete search history.

(56) References Cited

U.S. PATENT DOCUMENTS

| | | | | |
|---|---|---|---|---|
| 2,454,510 A | * | 11/1948 | Heyman ........................ | 426/594 |
| 2,977,231 A | * | 3/1961 | Fox et al. ...................... | 426/116 |
| 3,070,265 A | * | 12/1962 | Everett ........................ | 222/386.5 |
| 3,119,695 A | * | 1/1964 | Kahan ............................ | 426/116 |
| 3,727,640 A | * | 4/1973 | Sargeant ........................ | 137/889 |
| 5,199,609 A | * | 4/1993 | Ash, Jr. ............................ | 222/94 |
| 5,320,255 A | * | 6/1994 | Stoffel et al. ................... | 222/212 |
| 5,915,598 A | * | 6/1999 | Yazawa et al. ............. | 222/402.1 |
| 7,861,646 B2 | * | 1/2011 | Bockbrader ............... | 222/146.6 |
| 2001/0026821 A1 | * | 10/2001 | Scoville et al. ............... | 426/115 |
| 2006/0016347 A1 | * | 1/2006 | Girard et al. .................... | 99/295 |
| 2007/0003683 A1 | * | 1/2007 | Inoue et al. .................... | 426/594 |
| 2007/0272317 A1 | * | 11/2007 | Klopfenstein et al. ........ | 137/889 |
| 2008/0317924 A1 | * | 12/2008 | Yang ............................ | 426/594 |
| 2010/0242497 A1 | * | 9/2010 | Bertone ...................... | 222/146.6 |

FOREIGN PATENT DOCUMENTS

| | | | | | |
|---|---|---|---|---|---|
| JP | 01289450 | A | * | 11/1989 | ................ A23F 5/24 |
| JP | 02042941 | A | * | 2/1990 | ................ A23F 5/24 |
| JP | 04311350 | A | * | 11/1992 | ................ A23F 5/28 |
| JP | 11075693 | A | | 3/1999 | |
| JP | 2002095416 | A | | 4/2002 | |
| JP | 2003159002 | A | * | 6/2003 | ................ A23F 5/28 |

OTHER PUBLICATIONS

JPO machine translation of JP 2003-159002 A, retrieved from http://www4.ipdl.inpit.go.jp/Tokujitu/tjsogodbenk.ipdl, Sep. 2, 2011, 10 pages.*

* cited by examiner

*Primary Examiner* — Stephen F Gerrity
(74) *Attorney, Agent, or Firm* — Fanelli Haag & Kilger PLLC

(57) ABSTRACT

A holder to dispense and prepare ice coffee, consisting of a first compartment containing liquid coffee extract, a second compartment containing a propellant, a nozzle with a valve, and whereby at least one additive, such as sugars, sweeteners, aromas or a combination thereof, can be added to the concentrate in order to spray a jet of product onto a liquid.

7 Claims, No Drawings

DISPENSER AND COMPOSITION TO MAKE ICE COFFEE

The present invention concerns a preparation of ice coffee and, in particular, a holder and pressurised dispenser containing an amount of liquid coffee extract to prepare ice coffee, whereby the liquid coffee extract with additives is composed in such a manner that no additional mixing is required.

Ice coffee is a refreshing beverage, consisting of a coffee extract mixed with flavouring which is added to a liquid, such as milk, and ice.

Ice coffee is traditionally prepared by mixing the various ingredients with a blender, whereby it is also possible to crush the ice at the same time.

Such a method is well-known in accordance with JP63301744.

Prepared ice coffee is sold in a recipient such as Nestlé's nescafé frappé®.

For some consumers the solution must be mixed better. EP1020121 therefore describes a powder which is better solvable in cold milk.

CA951567 and GR1004081 also describe granulates and crystals, respectively, which must be dissolved in order to prepare ice coffee.

Another method to prepare ice coffee is well-known from EP1098570, according to which a cooled coffee is obtained by putting a coffee extract in a liquid under low-oxygen conditions, and adding sodium carbonate as a buffer, sugar and honey. When opening the recipient, the extracted liquid is spread over the crushed ice.

JP2002095416 describes a method to prepare ice coffee in a transparent bottle, consisting of a coffee extract and a milk constituent phase, including an UHT treatment and an added sucrose fatty acid ester.

A cold coffee drink in accordance with JP11075693 is obtained by freezing a coffee concentrate with liquid cow's milk.

The main disadvantage of the above-mentioned techniques to prepare ice coffee is that the various ingredients must be mixed with supplementary additives. In addition, resealable recipients involve the risk of contamination.

The valuation of liquid coffee is expressed in brix, a sugar solution scale at a certain temperature and indicates how much of the liquid's mass-percent consists of sugar.

According to the "Tea & Coffee Trade Journal, Vol. 178/ No. 5, 2006", a pure liquid coffee extract with a brix of 23.5 is stable and has natural antimicrobial properties. In U.S. Pat. No. 3,119,695 a concentrate with 30 brix is stabilised.

Surprisingly, we have discovered that the composition of our liquid coffee extract with additives, contained in a pressurised recipient and sprayed onto a liquid, results in a reliable and high-quality ice coffee.

This invention is therefore aimed at providing a solution for the above-mentioned disadvantages.

A pressurised recipient is filled with a liquid coffee extract to which at least one of the following additives such as aromas, sugars and/or sweeteners is added in proportion, and which can be adapted depending on the consumer's preferences.

Our invention has the following advantages. The consumer himself determines the portion he wishes to consume, without having to close the recipient again afterwards, involving the risk of contamination.

In addition, the liquid coffee extract with additives is composed in such a manner that it has a high antimicrobial and stabilising effect.

Our invention does not require any additional mixing installations, since our pressurised dispenser sprays the composed extract onto a liquid surface, in the form of a jet, creating a mixing effect. This has a second advantage.

Another advantage is that our preparation method for ice coffee, by using an appropriate holder and dispenser, results in a layer of foam on the ice coffee. The gases in the holder and dispenser keep the consumable contents free of contamination and ensure the fire safety. This has a last advantage.

The invention is detailed below.

The preparation of ice coffee in accordance with our invention consists of a holder and dispenser, which is pressurised and allows the contents to be sprayed onto a liquid, in the form of a jet.

The holder consists of a space, containing a liquid coffee extract, and a space with a pressure medium. Both compartments are separated from each other. The holder is fitted with a nozzle and a valve to separate the compartment with the extract and the nozzle.

The composition of the liquid coffee extract consists of an amount of liquid coffee concentrate, to which at least one additive such as sugars, artificial sweeteners and aromas is added. The composition can be a combination of the foregoing, or a specific selection.

Sugars are mainly understood to mean, without any limitation, monosaccharides and disaccharides such as dextrose, fructose, glucose, saccharose (sucrose), maltose, etc. The artificial sweeteners mainly concern acesulfame K, sucralose, saccharine, aspartame, mannitol, sorbitol, xylitol, etc.

In addition, various aromas, both natural and artificial, can be added such as vanilla, nuts, alcohol-free flavouring such as rum, Irish cream, Amaretto, Whisky, Cognac, as well as cream, milk aroma, . . .

It is clear that the above-mentioned list of additives is not exhaustive and that other combinations are possible as well.

In addition, the additives can be added to the composition in a variety of forms, i.e. liquid, viscous, powdered, gel, . . .

The proportion between the additives is such that the consumer can choose the composition which meets his preferences.

The holder has a space with a pressure medium. This pressure medium preferably is a propellant, such as nitrogen ($N_2$) and/or nitrous oxide ($N_2O_2$). This pressure medium will dispense the product, mixed with additives, from the holder, through other space and through the nozzle.

Below are several possible compositions, but this list is not exhaustive. These examples are only illustrative and cannot be considered as a limitation for the invention.

EXAMPLE 1

Coffee concentrate 28 Brix: 450g.
Sweeteners : 7 g.
Vanilla aroma: 4 g.
Nitrogen : 2.8 g.

EXAMPLE 2

Coffee concentrate 40 Brix: 1000 g.
Sweeteners : 20 g.
Vanilla aroma: 12 g.
Amaretto aroma: 55 g.
Nitrogen : 8 g.

EXAMPLE 3

Coffee concentrate 40 Brix: 1000 g.
Sucralose: 8 g.

Acesulfame K: 10 g.
Vanilla aroma: 10 g.
Nitrogen : 9 g.

As regards the proportion, we suggest the following ratio
Coffee concentrate: 80-90%
Artificial sweeteners: 0-2%
Sugars (mono- and disaccharides) : 0-20%
Aromatic additives: 0-10%
Propellant (nitrogen and/or nitrous oxide) : 0.1-2%

The Brix value of the liquid coffee extract is preferably between 20 and 70.

In accordance with a possible embodiment, the holder is turned upside down, with the nozzle facing downwards, so that the product can be dispensed through the nozzle. A jet of liquid coffee extract with additives is then sprayed onto a liquid, through the nozzle. This liquid could be milk.

According to another possible embodiment, the holder is fitted in a dispensing device. This dispensing device allows the consumer to prepare ice coffee automatically. At least one holder is fitted in the dispensing device. In case of several holders with different composition, the consumer can choose his preferred holder.

This dispensing device can be fitted with a refrigerating device, to keep the holders sufficiently cool. Well-known refrigeration techniques such as pettier technology, convection, conduction, heat exchange, . . . are eligible.

The dispensing device can also be fitted with an ice generator to dispense ground ice shavings while dispensing the extract.

The invention claimed is:

1. A dispensing device for dispensing coffee or a coffee extract comprising:
   a. a housing comprising:
      i. a first compartment comprising a pressure medium;
      ii. a second compartment comprising coffee or coffee extract;
      iii. a nozzle in communication with the second compartment; and
      iv. a valve situated between the nozzle and the second compartment;
   wherein the pressure medium in the first compartment is capable of expelling the coffee or coffee extract from the second compartment; and wherein the coffee or coffee extract is located in the second compartment and has a brix value of 40.

2. The dispensing device of claim 1, wherein the second compartment further comprises sugar, a sweetener, an aromatic additive, or a combination thereof.

3. The dispensing device of claim 2, wherein the sugar is dextrose, fructose, glucose, saccharose (sucrose) or maltose.

4. The dispensing device of claim 2, wherein the sweetener is acesulfame K, sucralose, saccharine, aspartame, mannitol, sorbitol, or xylitol.

5. The dispensing device of claim 2, wherein the aromatic additive comprises both natural and artificial aromatic additives comprising vanilla, nuts, alcohol-free flavoring, or milk aroma.

6. The dispensing device of claim 1, wherein the second compartment further comprises about 80-90% coffee concentrate, about 0-2% sweeteners, about 0-20% mono-and disaccharides, and about 0-10% aromatic additives; and the first compartment comprises about 0.1-2% propellant.

7. The dispensing device of claim 1, wherein the coffee or coffee extract is used for making iced coffee.

\* \* \* \* \*